Aug. 12, 1958 J. L. GRATZMULLER 2,847,262
SEALING DEVICES
Filed Aug. 3, 1956
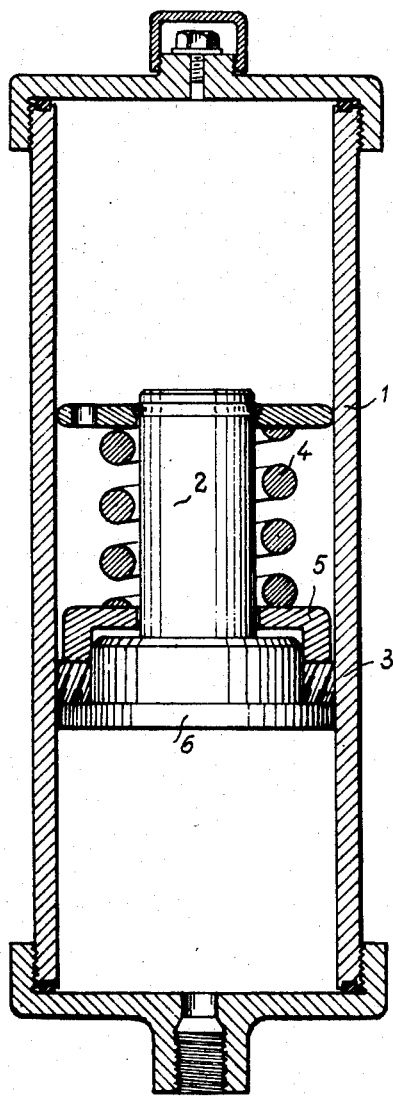
FIG.1
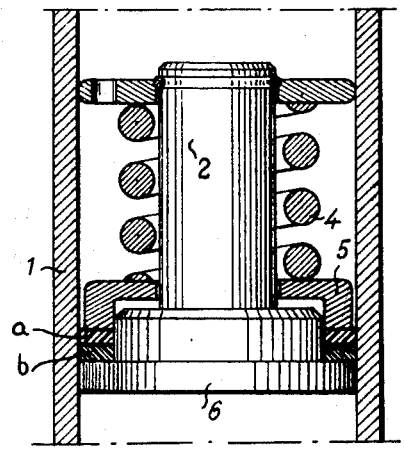
FIG.2
FIG.3
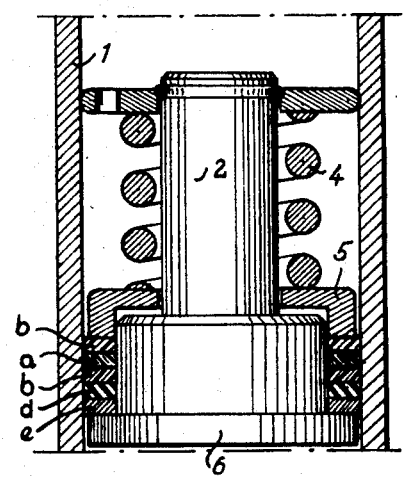
Inventor
J. L. Gratzmuller
By Mason Downing Seebold
Attys.

United States Patent Office 2,847,262
Patented Aug. 12, 1958

2,847,262

SEALING DEVICES

Jean Louis Gratzmuller, Paris, France

Application August 3, 1956, Serial No. 602,029

Claims priority, application France August 10, 1955

10 Claims. (Cl. 309—23)

In my U. S. patent specification No. 2,724,412 I have described a sealing device between two concentric cylindrical members and, in particular, members capable of receiving relative displacements, comprising a ring of plastic and elastic material housed in a space formed in one of the above-mentioned cylindrical members and coming into contact, by one of its cylindrical faces, with the wall of the other member, said ring being constantly acted upon by resilient means, in such a manner as to ensure a perfect sealing between the aforesaid two concentric cylindrical members.

Experience has proved that such a sealing device gives complete satisfaction for a very large number of relative displacements between the concentric cylindrical members, said number generally well exceeding one million operations.

It is the object of the present invention to improve the devices of the type described in the aforesaid patent and to enable them to effect the same sealing, whatever the number of relative displacements between the concentric cylindrical members with which the sealing device is used.

I have noticed that the possible causes of deterioration of the ring of plastic and elastic material, forming part of the sealing device, are of two kinds. A first cause of deterioration is due to the fact that the ring tends to "flow," that is to say, to infiltrate with its edge between the walls of the aforesaid two concentric cylindrical members, said tendency to flow being the greater, the lower the hardness of the ring, while the rings with low hardness offer the best resistance to wear.

The second possible cause of deterioration is the wear due to friction with the formation of scratches on the wall of the cylindrical member with which the active face of the ring comes into contact.

If, by way of example, the case is considered of a piston moving in a cylinder and carrying the sealing ring subject to the action of resilient means, as described in the above mentioned patent, and if, more particularly, and still by way of example, the case is considered of an oleo-pneumatic accumulator in which the piston in question separates a chamber filled with compressed gas from a chamber to which the oil may be supplied under pressure, it will be seen that if the piston is made of a material such as hard steel, and, in particular, harder than the material of which the cylinder is made, said piston is liable to scratch the cylinder.

Since, moreover, particularly in the case of an oleo-pneumatic accumulator, the cylinder should preferably be made of a relatively soft metal, such as, in particular, mild steel, so as to offer resilient resistance to bursting, and since, moreover, the piston must, at the same time, be impervious in its mass to the compressed air which may, for example, reach 400 atmospheres, and must not be deformed when an appreciable difference in pressure is established between its two faces, for example when, in the absence of oil in the accumulator, the piston is applied by a limited bearing surface against the cylinder head and oil under pressure is beginning to be introduced into the accumulator, it will be understood that it may be an advantage to make the piston of hard steel and, in particular, harder than the steel of which the cylinder is made.

In this case, after a very large number of operations, it is difficult to avoid scratches on the wall of the cylinder. These scratches are liable, in turn, to determine the wear on the aforesaid ring.

According to the present invention there is provided a sealing device between two cylindrical members, for example two cylindrical members adapted to receive a relative displacement of the general type comprising a sealing ring arranged in a housing formed in one of said members and which is compressed in the said housing by resilient means, characterised in that the sealing ring has at least two zones or sections of different hardnesses.

In one construction according to the invention, the hardness of the ring increases from its plane face, on which act the resilient means forming part of the device, to its plane face applied against the end of the housing in which it is placed. Thus, the less hard portion effects the sealing proper, under the most favourable conditions, while the harder portion prevents the ring from "flowing" between the two concentric cylindrical members.

The ring of variable hardness may consist of a plurality of thin rings cut out of sheets of plastic and elastic materials of different hardnesses, stacked up in turn in such a manner that the ring of the hardest material is situated at the end of the aforesaid housing.

According to one form of construction, two rings are provided, one of plastic and elastic material of a low hardness and the other of a plastic and elastic material which is harder, arranged in such a manner that the harder ring is situated at the bottom of the housing.

In another construction according to the invention the central portion of the ring has a low hardness, in such a manner as to serve as the sealing member proper, while the regions situated on each side of said central portion are of greater hardness, so as to prevent the ring from flowing in the two directions.

According to still another embodiment of the invention applicable, in particular, in the case where the movable member, such as a piston, is made of a harder metal than that of which the stationary member is made, there is placed in the bottom of the housing intended to receive the ring or rings as indicated above, a ring of anti-friction metal, the diameter of the active face of this ring of anti-friction metal being such that the active face of said ring bears against the wall of the other concentric cylindrical member, instead of the wall of the member which carries the ring.

In particular, provision is made to use such a ring of anti-friction metal in combination with a ring of plastic and elastic material of decreasing hardness or with a ring of plastic and elastic material consisting of at least two thin rings of different hardness.

The invention will be better understood by reference to the attached drawings which illustrate, by way of non-limiting example, some embodiments of the said invention.

In these drawings:

Fig. 1 is a view in axial section of an oleo-pneumatic energy accumulator, to the piston of which the present invention is applied by way of example;

Fig. 2 is a section of part of the piston of the accumulator in Fig. 1, showing a modified form of construction; and Fig. 3 is a similar view of another modification.

Referring first to Fig. 1, 1 is a cylinder in which is displaced a free piston 2. Provided in the piston 2 is a peripheral groove of substantially rectangular section in which is housed a sealing ring 3 subject to the pressure of a spring 4 by means of an annular member 5.

In accordance with the invention, the ring 3 is less hard in the portion which comes into contact with the annular member 5 than in the portion which is at the bottom of the housing in which it is placed. As indicated above, the less hard portion of the ring affords the desired sealing while the harder portion prevents the ring from flowing between the piston and the cylinder.

In the embodiment shown in Fig. 1, the ring consists of a single member of plastic and elastic material and is treated in such a manner that its hardness is different in the various regions of the ring.

According to a modified form of construction, the ring 3 is treated in such a manner that it is its central portion which is the softest, while the hardness of the ring, on the other hand, is greater in the vicinity of its two plane faces.

With such an arrangement, it is the central portion which effects the sealing, while the hard portions prevent the ring from flowing in one direction or the other.

In the embodiment shown in Fig. 2, the ring 3 consists of two superposed members, $a$ and $b$, respectively, the ring $a$ being made of a material of lower hardness than that of the ring $b$.

In Fig. 3, the peripheral groove in the piston receives a ring $a$ between two rings $b$ of greater hardness than ring $a$, and in addition a ring $d$ of greater hardness than rings $b$, and a ring $e$ of brass or anti-friction metal.

The ring $a$ may be of 40 degrees "Shore" hardness, the ring $b$ of 65 degrees and the ring $d$ of 80 degrees.

In this embodiment, the diameter of the portion 6 of the piston is reduced in such a manner that the guiding of the free piston is effected by the ring $e$, the diameter of which is substantially equal to the internal diameter of the cylinder. It should be clearly understood that such a ring of anti-friction metal $e$ may be combined, without going outside the scope of the invention, either with a plurality of rings of different hardnesses, or with a single ring of constant hardness, or again, with a single ring of variable hardness as specified in the course of the description of Fig. 1.

It should also be understood that although, above, the invention has been described as applied to an oleopneumatic energy accumulator, the invention is by no means limited to such an application and may be used with sealing devices of all types, as described, in particular, in my above-mentioned patent specification.

What I claim is:

1. A sealing arrangement provided between two relatively displaceable inner and outer members having facing cylindrical surfaces, said sealing means comprising a sealing ring means accommodating housing defined between a radial surface on the inner member, the cylindrical surface of the outer member and a facing cylindrical surface on the inner member extending axially of the radial surface, plastically deformable sealing ring means within said housing and including at least two zones of different hardness characteristics and resiliently actuated means continuously compressing the sealing ring means in the housing against facing cylindrical surfaces thereof.

2. A sealing arrangement as claimed in claim 1 in which the sealing means is constituted by a single ring having zones of different hardness characteristics.

3. A sealing arrangement as claimed in claim 1 in which the zone of the sealing ring means adjacent the radial surface of the housing has the hardest hardness characteristic, while the remainder of the sealing ring means has less hardness characteristic.

4. A sealing arrangement as claimed in claim 1 in which the sealing ring means is a single annulus of rectangular cross section including at least two zones of different hardness characteristics with that zone of said single ring adjacent the radial surface having the hardest hardness characteristic.

5. A sealing arrangement as claimed in claim 1 in which the plastically deformable sealing ring means has more than two zones of different hardness characteristics including an intermediate zone of the low hardness characteristic and zones on either side of said intermediate zone of greater hardness characteristic.

6. A sealing arrangement as claimed in claim 1 in which the plastically deformable sealing ring means comprises at least two superposed separate rings of respectively different hardness characteristics with the ring adjacent the radial surface having the hardest hardness characteristic.

7. A sealing arrangement as claimed in claim 1 in which the inner and outer cylindrical members are respectively a disc piston having an axial extension of reduced diameter defining the said radial surface and a cylinder accommodating said piston for sliding movement, said housing being defined between the interior of the cylinder and the exterior of the reduced portion of the piston, a ring of anti-friction metal surrounding the reduced portion of the piston and in engagement with the radial surface and said sealing ring means being mounted on said ring of anti-friction metal.

8. In a hydropneumatic accumulator of the type including a cylinder having ports in the opposite ends for charging with gas and liquid, a piston slidably mounted within the cylinder intermediate the ports and separating the cylinder into a gas chamber and a liquid chamber, said piston including a disc element, a reduced cylindrical portion extending axially of the disc, abutment means carried by the piston in axially spaced relation from the disc element, elastically and plastically deformable sealing ring means mounted around the reduced portion of the piston and including at least two zones of different hardness characteristics, a seal-compressing ring means on the reduced portion of the piston bearing against said sealing ring means and resilient means biased between said seal-compressing ring and said abutment to continuously compress said sealing ring means against the interior of the cylinder.

9. In a hydropneumatic accumulator as claimed in claim 8 and said sealing ring means constituting a single annulus having zones of different hardness characteristics with that zone adjacent the disc having the hardest hardness characteristic.

10. In a hydropneumatic accumulator as claimed in claim 9 and a ring of anti-friction metal interposed between said disc and said sealing ring means.

References Cited in the file of this patent

UNITED STATES PATENTS

| 2,058,674 | Flinchum | Oct. 27, 1936 |
| 2,188,957 | Pfauser | Feb. 6, 1940 |
| 2,360,735 | Smith | Oct. 17, 1944 |
| 2,474,132 | Vernet | June 21, 1949 |
| 2,728,620 | Krueger | Dec. 27, 1955 |